(12) United States Patent
Mizuma

(10) Patent No.: US 12,120,418 B2
(45) Date of Patent: Oct. 15, 2024

(54) INFORMATION PROCESSING APPARATUS FOR CONTROLLING AN IMAGE CAPTURING AREA, INFORMATION PROCESSING METHOD, AND STORAGE MEDIUM

(71) Applicant: CANON KABUSHIKI KAISHA, Tokyo (JP)

(72) Inventor: Kenshiro Mizuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/935,797

(22) Filed: Sep. 27, 2022

(65) Prior Publication Data

US 2023/0101516 A1 Mar. 30, 2023

(30) Foreign Application Priority Data

Sep. 28, 2021 (JP) .................. 2021-158441

(51) Int. Cl.
*H04N 23/63* (2023.01)
(52) U.S. Cl.
CPC ......... *H04N 23/632* (2023.01); *H04N 23/635* (2023.01)
(58) Field of Classification Search
CPC .. H04N 23/632; H04N 23/635; H04N 23/611; H04N 23/62; H04N 23/631; H04N 23/695; H04N 23/69
USPC .................................................. 348/333.03
See application file for complete search history.

(56) References Cited

U.S. PATENT DOCUMENTS

| | | | |
|---|---|---|---|
| 6,977,676 B1 * | 12/2005 | Sato ................ | H04N 7/142 348/E7.086 |
| 8,432,475 B2 | 4/2013 | Fujita et al. | |
| 9,253,388 B2 | 2/2016 | Kinoshita et al. | |
| 2005/0100087 A1 * | 5/2005 | Hasegawa ......... | H04N 7/181 348/E7.086 |
| 2006/0115185 A1 * | 6/2006 | Iida .................. | H04N 5/2628 |
| 2010/0141803 A1 * | 6/2010 | Jung ................. | H04N 5/262 348/E5.051 |
| 2011/0019027 A1 * | 1/2011 | Fujita .............. | H04N 23/611 348/222.1 |
| 2011/0164062 A1 * | 7/2011 | Nakamura ........ | G06F 3/016 345/173 |

(Continued)

FOREIGN PATENT DOCUMENTS

| | | |
|---|---|---|
| JP | 2009212637 A | 9/2009 |
| JP | 2010081041 A | 4/2010 |

(Continued)

*Primary Examiner* — Usman A Khan
(74) *Attorney, Agent, or Firm* — Canon U.S.A., Inc., IP Division

(57) ABSTRACT

An information processing apparatus that communicates with an image capturing apparatus that includes an image capturing unit causes a display unit to display a first window including an image captured by the image capturing unit and a second window including an icon for controlling an image capturing area of the image capturing unit, receives a user operation for designating a position of the icon in the second window displayed on the display unit, and controls the image capturing area of the image capturing unit based on a position of the icon in the second window that is based on the received user operation and a position of a target object detected from a captured image.

14 Claims, 12 Drawing Sheets

(56) References Cited

U.S. PATENT DOCUMENTS

| | | | | |
|---|---|---|---|---|
| 2012/0062769 A1* | 3/2012 | Kinoshita | ............ | H04N 23/611 |
| | | | | 348/E5.045 |
| 2012/0268641 A1* | 10/2012 | Kazama | ................ | H04N 23/45 |
| | | | | 348/E5.051 |
| 2015/0363076 A1* | 12/2015 | Komatsu | ............ | G06F 3/04842 |
| | | | | 715/765 |
| 2019/0082101 A1* | 3/2019 | Baldwin | .............. | H04N 23/635 |
| 2022/0394190 A1* | 12/2022 | Cui | ........................ | H04N 23/62 |

FOREIGN PATENT DOCUMENTS

| JP | 2011209620 A | 10/2011 |
|---|---|---|
| JP | 2012029245 A | 2/2012 |
| JP | 2014039166 A | 2/2014 |

* cited by examiner

INFORMATION PROCESSING APPARATUS FOR CONTROLLING AN IMAGE CAPTURING AREA, INFORMATION PROCESSING METHOD, AND STORAGE MEDIUM

BACKGROUND

Field

Aspects of the present disclosure generally relate to an information processing apparatus.

Description of the Related Art

Recently, in the video production market, the number of systems configured to control an image capturing apparatus connected to a network from a remote location has been increasing. In such systems, there is an application capable of, while causing a video image captured by an image capturing apparatus to be displayed, changing a range in which the image capturing apparatus performs image capturing (hereinafter referred to as an "image capturing area") by controlling pan, tilt, and zoom (PTZ) of the image capturing apparatus.

As a method of controlling the image capturing area of an image capturing apparatus, there is a method of controlling PTZ based on the position or size of a subject. Japanese Patent Application Laid-Open No. 2011-209620 discusses a method to perform image capturing of a subject in a desired image capturing area by calculating a ratio between two regions, i.e., the entire region of a subject and the partial region of the subject (e.g., a head region thereof), and controlling a zoom magnification to make the calculated ratio constant according to a zoom operation.

In the field site of video production, there is a case where the user who controls an image capturing apparatus becomes conscious of a composition in the angle of view and wants to control an image capturing area in such a manner that a subject is located at a desired position in the image capturing area. Here, an operation for, while controlling PTZ with use of, for example, a joystick, controlling an image capturing area in such a manner that a subject is located at a desired position in the image capturing area can be troublesome.

SUMMARY

Aspects of the present disclosure are generally directed to simplifying an operation for controlling an image capturing area such that a subject is located at a position desired by the user in the image capturing area.

According to an aspect of the present disclosure, an information processing apparatus that communicates with an image capturing apparatus including an image capturing unit, the information processing apparatus comprising a memory and a processor configured to communicate with the memory, wherein the processor executes a program stored in the memory to cause the information processing apparatus to cause a display unit to display a first window including an image captured by the image capturing unit and a second window including an icon for controlling an image capturing area of the image capturing unit, receive a user operation for designating a position of the icon in the second window displayed on the display unit, and control the image capturing area of the image capturing unit based on a position of the icon in the second window and a position of a target object detected from an image captured by the image capturing unit.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings. Configurations described in the following exemplary embodiments are merely examples, and the exemplary embodiments are not limited to the illustrated configurations.

Figure 1:
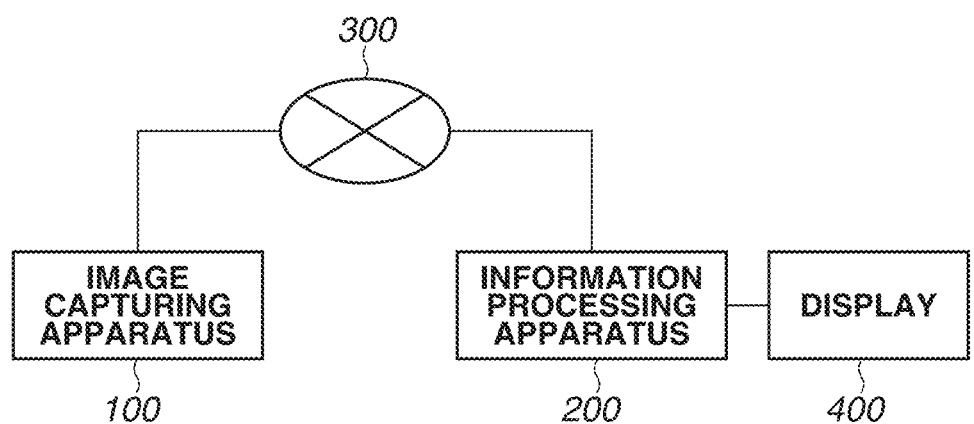
FIG. 1 is a diagram illustrating a system configuration.

FIG. 1 illustrates an example of a system configuration in a first exemplary embodiment. The system in the first exemplary embodiment includes an image capturing apparatus 100, an information processing apparatus 200, a display 400, and a network 300.

The image capturing apparatus 100 and the information processing apparatus 200 are connected to each other via the network 300. The network 300 is implemented by, for example, a plurality of routers, switches, and cables compliant with, for example, Ethernet.

The network 300 can also be implemented by, for example, the Internet, a wired local area network (LAN), a wireless LAN, or a wide area network (WAN).

The image capturing apparatus 100 captures images and transmits image data associated with the captured image, information about the image capturing date and time of the captured image, identification information for identifying the image capturing apparatus 100, and information about the image capturing area of the image capturing apparatus 100 to an external device, such as the information processing apparatus 200, via the network 300. The information processing apparatus 200 is, for example, a client device, such as a personal computer, with a program for implementing the function of processing described below installed thereon. While, in the system in the first exemplary embodiment, a single image capturing apparatus 100 is included, in another exemplary embodiment, a plurality of image capturing apparatuses 100 can be included, all of which can be connected to the information processing apparatus 200 via the network 300. In this case, the information processing apparatus 200 determines from among the plurality of image capturing apparatuses 100 which one the received image was captured with using identification information associated with the received image.

The display 400, which is configured with, for example, a liquid crystal display (LCD), displays, for example, an image captured by the image capturing apparatus 100. The display 400 is connected to the information processing apparatus 200 via a display cable compliant with a communication standard such as High-Definition Multimedia Interface (HDMI®). The display 400 and the information processing apparatus 200 can be provided in a single housing.

Figure 2:
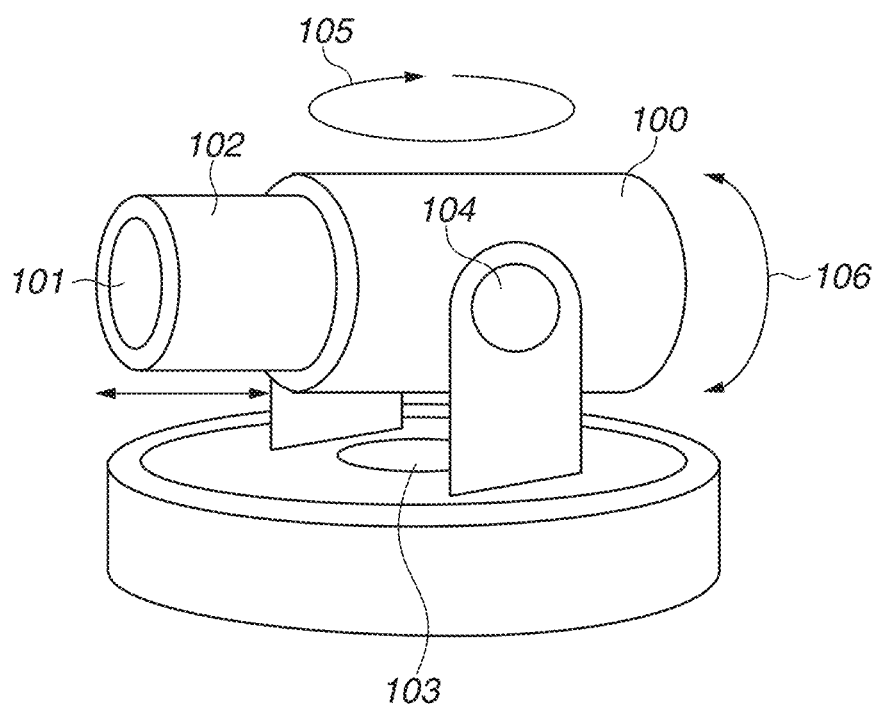
FIG. 2 is a diagram illustrating an outer appearance of an image capturing apparatus.
Figure 3:
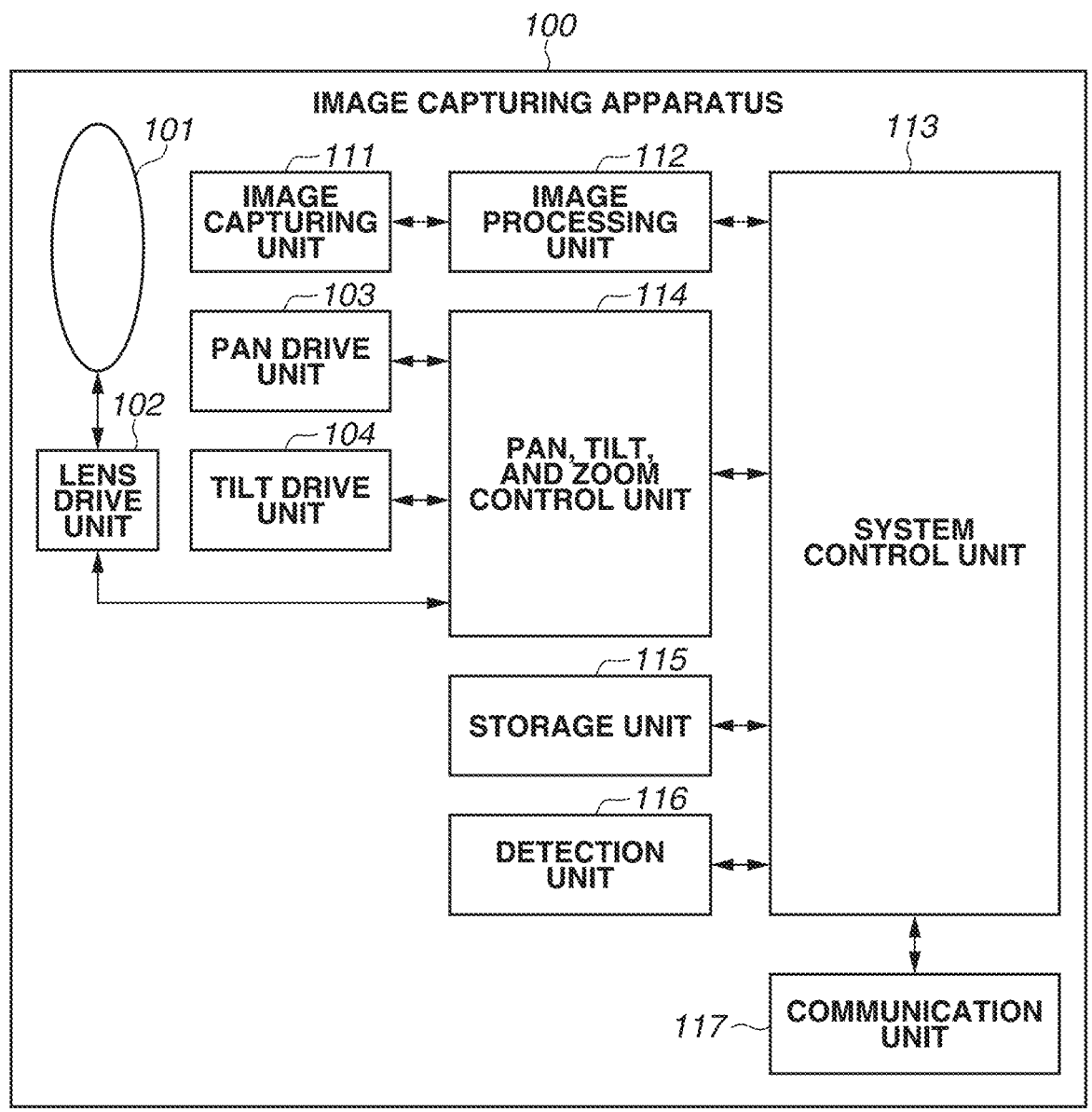
FIG. 3 is a diagram illustrating functional blocks of the image capturing apparatus.

The image capturing apparatus 100 according to the first exemplary embodiment will now be described with reference to FIG. 2 and FIG. 3. FIG. 2 is a diagram illustrating an example of an outer appearance of the image capturing apparatus 100 in the first exemplary embodiment. FIG. 3 is a diagram illustrating an example of functional blocks of the image capturing apparatus 100 in the first exemplary embodiment. From among the functional blocks of the image capturing apparatus 100 illustrated in FIG. 3, the functions of, for example, an image processing unit 112, a system control unit 113, a pan, tilt, and zoom control unit 114, a storage unit 115, a detection unit 116, and a communication unit 117 are assumed to be implemented by a central processing unit (CPU) 1200 (described below with reference to FIG. 12) of the image capturing apparatus 100 executing a computer program stored in a read-only memory (ROM) 1220 (described below with reference to FIG. 12) of the image capturing apparatus 100.

The direction in which the optical axis of a lens 101 is directed is an image capturing direction of the image capturing apparatus 100, and a light flux having passed through the lens 101 is focused on an image sensor of an image capturing unit 111 of the image capturing apparatus 100. A lens drive unit 102, which is configured with a drive system for driving the lens 101, changes the focal length of the lens 101. The lens drive unit 102 is controlled by the pan, tilt, and zoom control unit 114.

A pan drive unit 103 is configured with a mechanical drive system for performing a pan operation and a motor serving as a drive source thereof, and performs driving control to cause the image capturing direction of the image capturing apparatus 100 to turn in a pan direction 105 (a rotational direction parallel with the installation surface of the image capturing apparatus 100). The pan drive unit 103 is controlled by the pan, tilt, and zoom control unit 114.

A tilt drive unit 104 is configured with a mechanical drive system for performing a tilt operation and a motor serving as a drive source thereof, and performs driving control to cause the image capturing direction of the image capturing apparatus 100 to turn in a tilt direction 106 (a rotational direction perpendicular to the installation surface of the image capturing apparatus 100). The tilt drive unit 104 is controlled by the pan, tilt, and zoom control unit 114.

The image capturing unit 111 is configured with an image sensor (not illustrated), such as a charge-coupled device (CCD) sensor or a complementary metal-oxide semiconductor (CMOS) sensor. The image capturing unit 111 photo-electrically converts a subject image formed through the lens 101 to generate an electrical signal. The image processing unit 112 performs processing for converting an electrical signal obtained by photoelectrical conversion performed by the image capturing unit 111 into a digital signal and image processing, such as compression coding processing, to generate image data.

The pan, tilt, and zoom control unit 114 controls at least one of the pan drive unit 103, the tilt drive unit 104, or the lens drive unit 102 based on an instruction transmitted from the system control unit 113. This enables, the image capturing apparatus 100 to control the image capturing area by controlling at least one of pan, tilt, or zoom operation(s).

The storage unit 115 stores, for example, information indicating an image capturing area. The communication unit 117 performs communication with the information processing apparatus 200 via an interface (I/F) 1204 (described below with reference to FIG. 12). For example, the communication unit 117 transmits image data about an image captured by the image capturing apparatus 100 to the information processing apparatus 200 via the network 300. The communication unit 117 transmits information indicating the image capturing area of the image capturing apparatus 100. The communication unit 117 receives a control command, which is a command for controlling the image capturing apparatus 100, transmitted from the information processing apparatus 200, and transfers the received control command to the system control unit 113.

The detection unit 116 performs processing for detecting an object included in an image that is based on image data generated by the image processing unit 112 (i.e., an image captured by the image capturing apparatus 100). The image that is based on image data as described herein is, for example, an image obtained by decoding image data subjected to compression coding processing by the image processing unit 112. The image that is based on image data can be, for example, an image obtained before being subjected to compression coding processing by the image processing unit 112. The detection unit 116 in the first exemplary embodiment performs detection of the face of a person included in an image by performing processing such as pattern matching using a collation pattern (dictionary). In detecting the face of a person from an image, the detection unit 116 can be configured to detect the face of a person from an image using a plurality of collation patterns such as a collation pattern for a case where the face of a person is front facing and a collation pattern for a case where the face of a person is laterally facing. Performing detection processing using a plurality of collation patterns enables expecting an improvement in detection accuracy.

While, in the first exemplary embodiment, the detection unit 116 detects the face of a person as a subject to be detected from an image, this is not seen to be limiting. In another exemplary embodiment, the detection unit 116 can detect another object, such as a vehicle, or can detect another portion of a person, such as the upper body or the entire body of a person. While the detection unit 116 in the first exemplary embodiment uses pattern matching processing as a method of detecting an object from an image, this is not seen to be limiting. In another exemplary embodiment, the detection unit 116 can detect an object from an image using another conventional technique. While, in the description of the first exemplary embodiment, the image capturing apparatus 100 performs detection processing for detecting an object, this is not seen to be limiting. In another exemplary embodiment, another apparatus, such as the information processing apparatus 200, can be configured to perform detection processing for detecting an object.

Information about a result of detection from an image by the detection unit 116 (hereinafter referred to as "detection result information") is transmitted by the communication unit 117 to the information processing apparatus 200 while being associated with the image. The detection result information that is associated with an image is assumed to include information about the position and size, on the image, of the face of a person detected from the image. The position, on an image, of the face of a person is assumed to be expressed by an X-coordinate and a Y-coordinate, on the image, of the position of the center of mass of a circumscribed rectangle of the face of the person with an upper left vertex of the image set as the origin. The size, on an image, of the face of a person is assumed to be expressed by a horizontal width size and a vertical width size of a circumscribed rectangle of the face of the person in the image. The position and size of the face of a person only needs to be discriminable, and the position and size of a person can be expressed by another method. The storage unit 115 stores detection result information about a person detected from an image by the detection unit 116 and image data about the image while associating them with each other.

Figure 12:
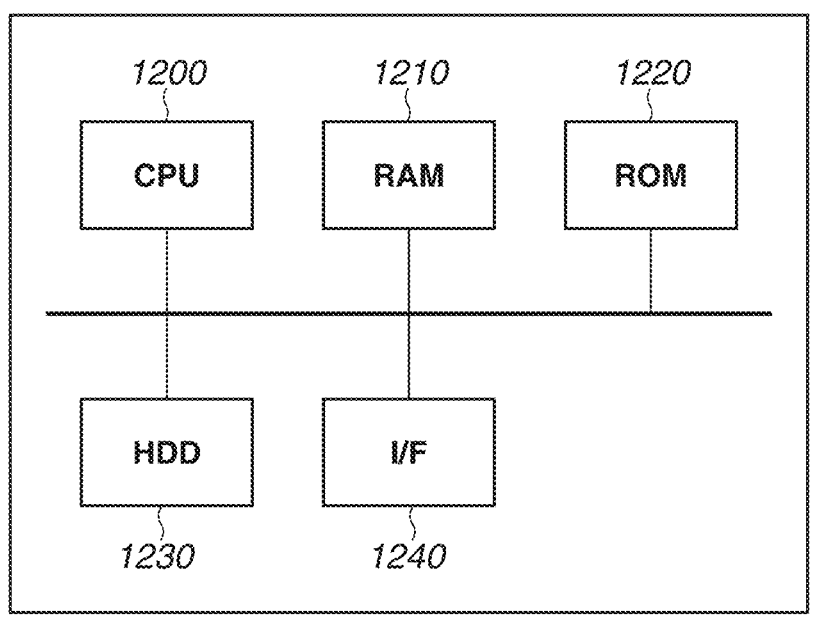
FIG. 12 is a diagram illustrating a hardware configuration of each apparatus.

The system control unit 113 controls the image capturing apparatus 100 based on processing that a CPU 1200 (described below with reference to FIG. 12). The system control unit 113 analyzes a control command for controlling the image capturing apparatus 100 transmitted from the information processing apparatus 200, and performs processing corresponding to the control command. The system control unit 113 issues an instruction for a pan, tilt, or zoom operation to the pan, tilt, and zoom control unit 114. When transmitting image data generated by the image processing unit 112 to the information processing apparatus 200, the system control unit 113 also appends, to the image data, information about an image capturing clock time of an image from which the image data has been generated.

The image capturing area in the first exemplary embodiment is determined by a pan value, a tilt value, and a zoom value of the image capturing apparatus 100. The pan value is the angle of the image capturing direction (optical axis) in the pan direction 105 of the image capturing apparatus 100 with one of drive ends of the pan drive unit 103 set as 0°. The tilt value is the angle of the image capturing direction (optical axis) in the tilt direction 106 of the image capturing apparatus 100 with one of drive ends of the tilt drive unit 104 set as 0°. The zoom value of the image capturing apparatus 100 at the time of an image being captured by the image capturing apparatus 100 is calculated from the focal length of the lens 101. The communication unit 117 periodically transmits information about the current pan value, tilt value, and zoom value of the image capturing apparatus 100 (hereinafter referred to as "PTZ information") to the information processing apparatus 200. The communication unit 117 can be configured to transmit the current PTZ information (changed PTZ information) to the information processing apparatus 200 when a change has occurred in at least one of a pan value, a tilt value, or a zoom value.

Figure 4:
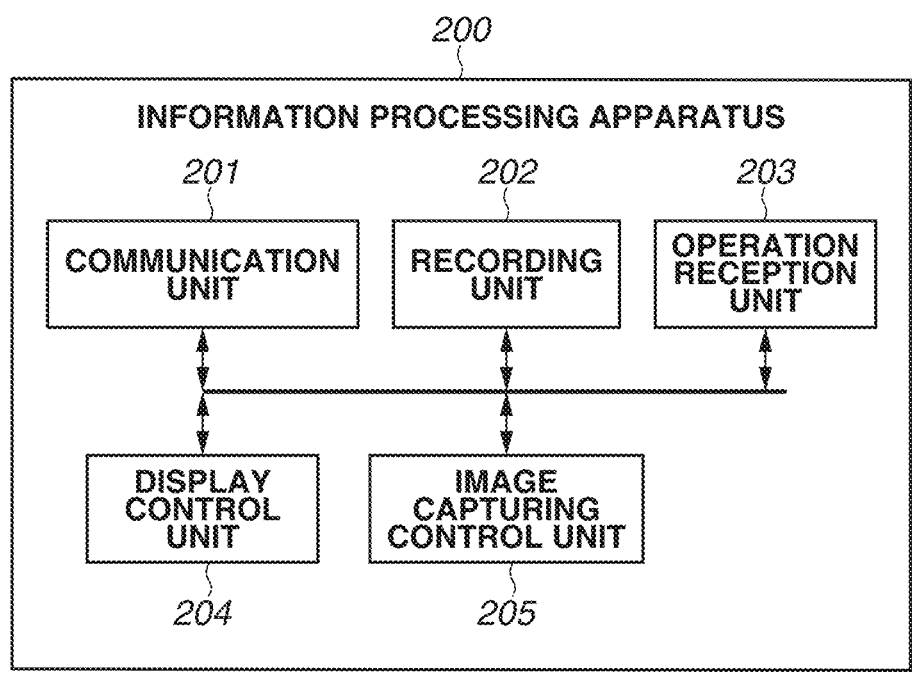
FIG. 4 is a diagram illustrating functional blocks of an information processing apparatus.

Information processing that is performed by the information processing apparatus 200 in the first exemplary embodiment is described with reference to the functional blocks of the information processing apparatus 200 illustrated in FIG. 4. The functions of the information processing apparatus 200 are assumed to be implemented as follows using a ROM 1220 and a CPU 1200 (each described below with reference to FIG. 12). Thus, the functions illustrated in FIG. 4 are implemented by the CPU 1200 of the information processing apparatus 200 executing a computer program stored in the ROM 1220 of the information processing apparatus 200.

A communication unit 201 acquires image data transmitted from the image capturing apparatus 100 via an interface (I/F) 1240 (described below with reference to FIG. 12). A recording unit 202, which is implemented by, for example, a random access memory (RAM) 1210 or a hard disk drive (HDD) 1230 (each described below with reference to FIG. 12), records information and data associated with information processing to be performed by the information processing apparatus 200. For example, the recording unit 202 records detection result information and PTZ information transmitted from the image capturing apparatus 100 in association with an image.

An operation reception unit 203 receives an operation performed by the user via an input device (not illustrated) such as a keyboard or a mouse. A display control unit 204 causes the display 400 to display an image that is based on image data acquired by the communication unit 201. The image that is based on image data as described herein is an image that is obtained by the information processing apparatus 200 decoding image data subjected to compression coding and transmitted. The display control unit 204 causes the display 400 to display a graphical user interface (GUI) used for controlling the image capturing area of the image capturing apparatus 100. The details of windows that are displayed by the display control unit 204 are described below.

An image capturing control unit 205 performs processing for controlling the image capturing area of the image capturing apparatus 100 based on a user operation performed on a window displayed by the display control unit 204. Specifically, the image capturing control unit 205 generates a control command for changing at least one of a pan value, a tilt value, or a zoom value of the image capturing apparatus 100, and transmits the control command to the image capturing apparatus 100 via the communication unit 201. The image capturing apparatus 100 controls the image capturing area thereof based on the control command transmitted from the information processing apparatus 200. For example, when the operation reception unit 203 receives a user operation for changing the pan value of the image capturing apparatus 100 by a predetermined value in the pan direction 105, the image capturing control unit 205 generates a control command for changing the pan value by a predetermined value in the pan direction 105, and transmits the control command to the image capturing apparatus 100 via the communication unit 201. The image capturing apparatus 100 changes the pan angle by a predetermined angle in the pan direction 105 by controlling the pan drive unit 103 based on the acquired control command.

GUIs, each of which are displayed by the display control unit 204 of the information processing apparatus 200, are described with reference to FIGS. 5A, 5B, and 5C. An image captured by the image capturing apparatus 100 is displayed at a video display portion 501 in a GUI 500 illustrated in FIG. 5A. The image that is displayed at the video display portion 501 can be a still image being one of images captured by the image capturing apparatus 100 or can be a moving image composed of a series of images captured by the image capturing apparatus 100.

The display control unit 204 causes a circumscribed rectangle (a detection frame) indicating the position and size of the face of a person detected from the captured image to be displayed in superimposition on the captured image based on detection result information about the captured image. In the example illustrated in FIG. 5A, a circumscribed rectangle 504 is superimposed on the face of a person 502, and a circumscribed rectangle 505 is superimposed on the face of a person 503. A mark, instead of a circumscribed rectangle, for making the detected object discriminable, such as a surrounding ellipse or circle or a pointing arrow, can be superimposed.

Figure 5A:
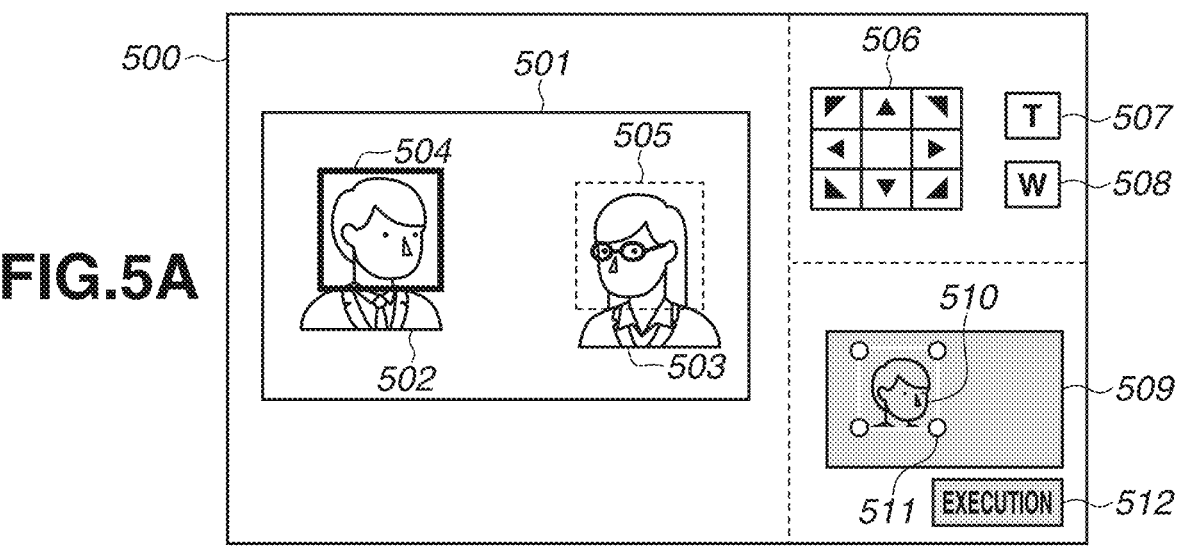
FIGS. 5A, 5B, and 5C are diagrams used to explain graphical user interfaces (GUIs) for controlling an image capturing area.
Figure 5B:
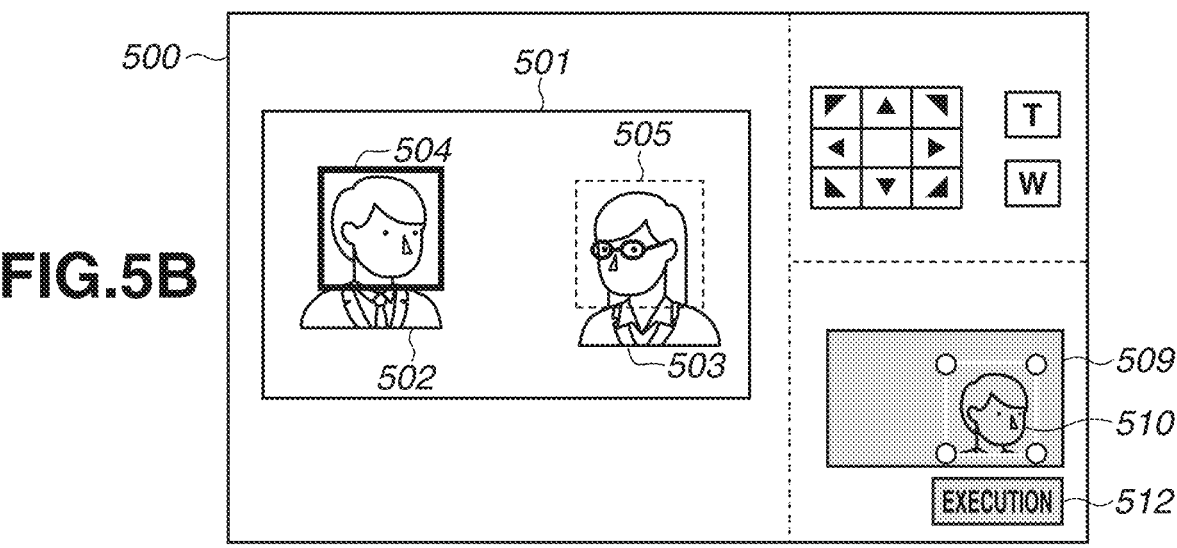
Figure 5C:
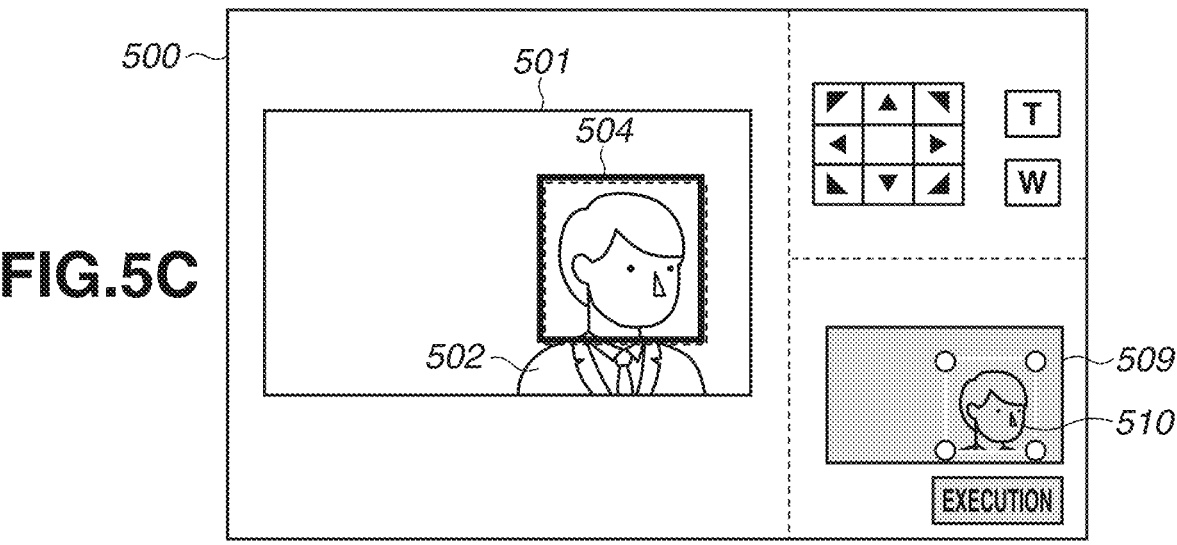

As illustrated in FIG. 5A, in the GUI 500, a PT control button 506, a telephoto button 507, and a wide-angle button 508 are displayed. In an example, presume the operation reception unit 203 has received a user operation for pressing a direction key shown in the PT control button 506. At this time, the image capturing control unit 205 generates a control command for controlling at least one of pan or tilt of the image capturing apparatus 100 according to the pressed direction key, and transmits the control command to the image capturing apparatus 100. In a case where the operation reception unit 203 receives a user operation for pressing the telephoto button 507, the image capturing control unit 205 generates a control command for enlarging the zoom value of the image capturing apparatus 100 (for performing zoom-in), and transmits the control command to the image capturing apparatus 100. Similarly, when the operation reception unit 203 receives a user operation for pressing the wide-angle button 508, the image capturing control unit 205 generates a control command for reducing the zoom value of the image capturing apparatus 100 (for performing zoom-out), and transmits the control command to the image capturing apparatus 100.

The above-described functionality enables the user to manually control the image capturing area of the image capturing apparatus 100 by pressing the PT control button 506, the telephoto button 507, or the wide-angle button 508. The GUI 500 can also include, for example, buttons enabling controlling, for example, the exposure, white balance, or shutter speed of the image capturing apparatus 100.

As illustrated in FIG. 5A, the GUI 500 includes a window 509 for controlling the image capturing area of the image capturing apparatus 100 by designating a composition of a subject included in an image. The width-to-height ratio (aspect ratio) of a rectangle of the window 509 is assumed to be equal to the width-to-height ratio (aspect ratio) of an image that is captured by the image capturing apparatus 100. In the window 509, an icon 510 corresponding to a target object serving as a criterion for control of the image capturing area is arranged. In an example, presume the face of the person 502 is currently selected as a target object serving as a criterion for control of the image capturing area. When a specific circumscribed rectangle from among the circumscribed rectangles superimposed on an image in the video display portion 501 has been selected by the user, the image capturing control unit 205 specifies, as a target object, the face of a person corresponding to the specific circumscribed rectangle. The display control unit 204 makes the display form of the circumscribed rectangle of the face of the person 502 different from that of a circumscribed rectangle corresponding to the face of another person (person 503) to expressly indicate that the face of the person 502 is currently selected as a target object. A partial image of the face of the person 502 clipped from the captured image is assumed to be used as the icon 510 that is displayed in the window 509. This approach is not seen to be limiting. In another exemplary embodiment, a graphic obtained by imitating a target object serving as a criterion for control of the image capturing area can be used as the icon 510. A circumscribed rectangle 511 is information indicating the position and size of the icon 510. The position of the icon 510 in the window 509 as described herein is assumed to be expressed by an X-coordinate and a Y-coordinate of the position of the center of mass of the circumscribed rectangle 511 with the upper left vertex of the window 509 set as the origin. The size of the icon 510 in the window 509 is assumed to be expressed by a horizontal width size and a vertical width size of the circumscribed rectangle 511. A user operation for dragging the circumscribed rectangle 511 enables moving the position of the icon 510 in the window 509, and a user operation for dragging a vertex of the circumscribed rectangle 511 enables changing the size of the icon 510 in the window 509. A GUI 500 illustrated in FIG. 5B illustrates a state obtained after the position and size of the icon 510 are changed by a user operation.

In an example, suppose that, after the position or size of the icon 510 has been changed based on a user operation (in the state illustrated in FIG. 5B), a user operation for pressing an execution button 512 has been performed. At this time, the image capturing control unit 205 performs processing for controlling the image capturing area of the image capturing apparatus 100 based on the position of the icon 510 in the window 509 and the position of a target object detected from the image. More specifically, the image capturing control unit 205 specifies an image capturing area where the positional relationship (relative position) of the icon 510 to the window 509 becomes identical to the positional relationship (relative position) of the detected face of the person 502 to the image captured by the image capturing apparatus 100. The image capturing control unit 205 then generates a control command for attaining the specified image capturing area. The generated control command is transmitted to the image capturing apparatus 100, enabling the image capturing apparatus 100 to control the image capturing area based on the received control command. The image capturing control unit 205 in the first exemplary embodiment can perform processing for controlling the image capturing area based on the position of the icon 510 in the window 509 as well as the size of the icon 510 in the window 509. Thus, the image capturing control unit 205 specifies an image capturing area satisfying, in addition to a first condition in which the positional relationship of the icon 510 to the window 509 becomes identical with the positional relationship of the detected face of the person 502 to the captured image, a second condition. The second condition is a condition where the ratio of the size of the icon 510 to the size of the window 509 becomes identical to the ratio of the size of the detected face of the person 502 to the size of the captured image. The image capturing control unit 205 specifies an image capturing area satisfying the first condition related to positions and the second condition related to sizes, and generates a control command for attaining the specified image capturing area. The generated control command is transmitted to the image capturing apparatus 100, enabling the image capturing apparatus 100 to control the image capturing area thereof based on the received control command. FIG. 5C illustrates an image captured after the image capturing area has been controlled in the above-described manner. In the image displayed in the video display portion 501 illustrated in FIG. 5C, the positional relationship (relative position) of the face of the person 502 to the displayed image has become identical to the positional relationship (relative position) of the icon 510 to the window 509. In the image displayed in the video display portion 501 illustrated in FIG. 5C, the ratio of the size of the face of the person 502 to the size of the displayed image has become identical to the ratio of the size of the icon 510 to the size of the window 509. As described above, according to the first exemplary embodiment, in the window 509, the user can move the icon 510 to an optional position or change the size of the icon 510, thus enabling simple control of the image capturing area such that a subject is located at a desired position.

The processing for displaying an image on which a circumscribed rectangle that is based on the detection result information has been superimposed, which is performed by the information processing apparatus 200, will be described with reference to a flow illustrated in FIG. 6. The processing in the flow illustrated in FIG. 6 is performed by the functional blocks illustrated in FIG. 4, which are implemented by, for example, the CPU 1200 of the information processing apparatus 200 executing a computer program stored in the ROM 1220 of the information processing apparatus 200.

First, in step S601, the communication unit 201 acquires image data about a captured image and detection result information associated with the captured image. Next, in step S602, the display control unit 204 determines whether one or more objects are being detected, based on a detection result included in the acquired detection result information. In the first exemplary embodiment, the display control unit 204 is assumed to determine whether one or more faces of persons are being detected.

If it is determined that one or more objects are being detected (YES in step S602), the display control unit 204 advances the processing to step S603, and, if it is determined that one or more objects are not being detected (NO in step S602), the display control unit 204 advances the processing to step S604. In step S603, the display control unit 204 displays, in the video display portion 501, a circumscribed rectangle, which is defined by information about the position and size of the detected object included in the detection result information, in superimposition on an image associated with the detection result information. In step S604, the display control unit 204 displays, in the video display portion 501, an image that is based on the acquired image data, without superimposing a circumscribed rectangle on the image.

Figure 6:
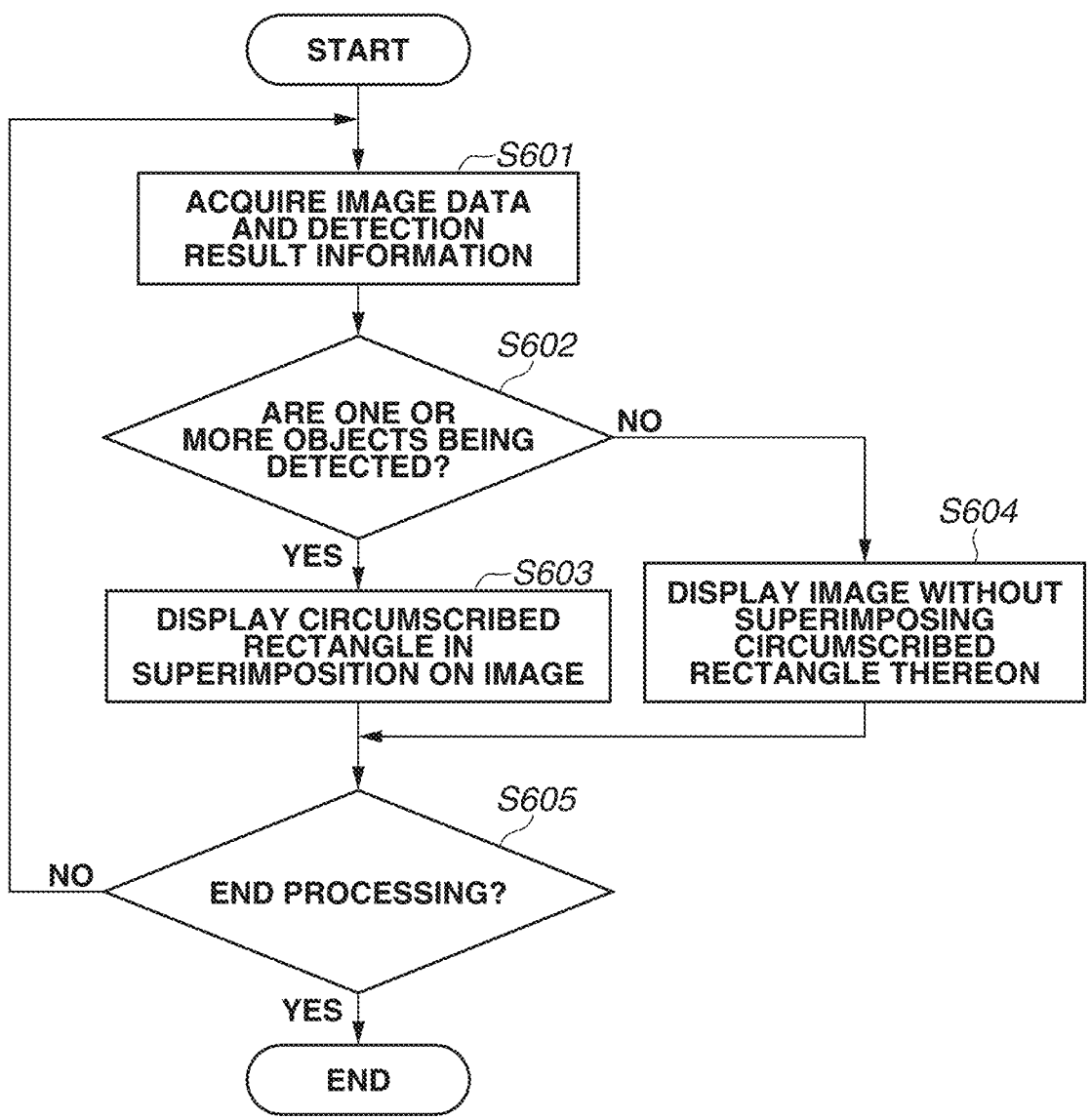
FIG. 6 is a flowchart illustrating the flow of processing for displaying a frame indicating a detection result.

In step S605, the display control unit 204 determines whether to end the processing in the flow illustrated in FIG. 6. If it is determined to end the processing (YES in step S605), the display control unit 204 ends the processing illustrated in FIG. 6. If it is determined not to end the processing (NO in step S605), the display control unit 204 returns the processing to step S601, and, in step S601, the communication unit 201 acquires image data of a next image and detection result information associated with the next image. Ending of the processing illustrated in FIG. 6 can also be performed in response to an instruction issued by the user. As described above, performing processing in the flow illustrated in FIG. 6 enables displaying, in the video display portion 501, a circumscribed rectangle in superimposition on an image.

Figure 7:
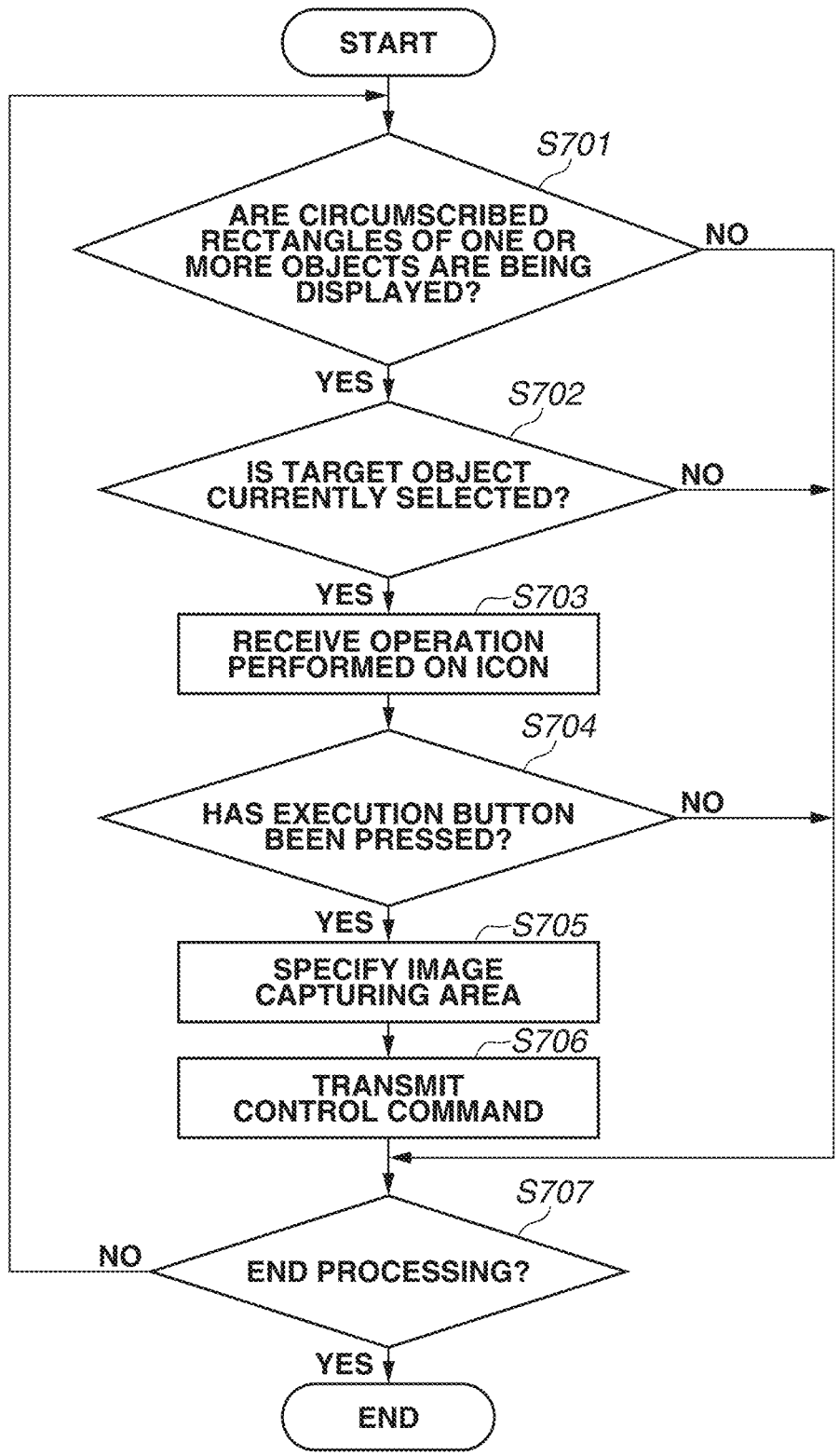
FIG. 7 is a flowchart illustrating the flow of processing for controlling an image capturing area.

Next, control processing for an image capturing area corresponding to a user operation performed on the icon 510 in the window 509 is described with reference to processing in a flow illustrated in FIG. 7. The processing in the flow illustrated in FIG. 7 is performed by the functional blocks illustrated in FIG. 4, which are implemented by, for example, the CPU 1200 of the information processing apparatus 200 executing a computer program stored in the ROM 1220 of the information processing apparatus 200. The processing in the flow illustrated in FIG. 7 is assumed to be performed in parallel with the processing in the flow illustrated in FIG. 6.

First, in step S701, the image capturing control unit 205 determines whether circumscribed rectangles of one or more objects are being displayed in superimposition on the image in the video display portion 501. If it is determined that circumscribed rectangles of one or more objects are not being displayed (NO in step S701), the image capturing control unit 205 advances the processing to step S707. In step S707, the image capturing control unit 205 determines whether to end the processing in the flow illustrated in FIG. 7. If it is determined to end the processing (YES in step S707), the image capturing control unit 205 ends the processing illustrated in FIG. 7. If it is determined not to end the processing (NO in step S707), the image capturing control unit 205 returns the processing to step S701, and the processing in step S701 is re-performed. If, in step S701, it is determined that circumscribed rectangles of one or more objects are being displayed (YES in step S701), the image capturing control unit 205 advances the processing to step S702. In step S702, the image capturing control unit 205 determines whether a target object serving as a criterion for control of the image capturing area is currently selected by the user. Here, for example, when a given circumscribed rectangle out of circumscribed rectangles superimposed on an image displayed in the video display portion 501 has been selected by the user, the image capturing control unit 205 specifies an object corresponding to the given circumscribed rectangle as a target object. While a method of selecting a target object is implemented by, for example, a click operation performed on a circumscribed rectangle, this method is not seen to be limiting. In another exemplary embodiment, for example, when each of circumscribed rectangle being displayed is assigned a number, if a given number is selected via a pull-down menu (not illustrated) displayed in the GUI 500, an object surrounded by a circumscribed rectangle corresponding to the given number can be selected as a target object. In FIG. 5A, an example in which the face of the person 502 has been specified as a target object is illustrated. Turning back to FIG. 7, in step S703, the operation reception unit 203 receives a user operation for changing the position or size of the icon 510 corresponding to the target object in the window 509. In response to a user operation for changing the position or size of the icon 510, the display control unit 204 also changes displaying of the icon 510. For example, if an operation for moving the icon 510 by a predetermined distance rightward in the horizontal direction is performed, in conformity with such an operation, the display control unit 204 moves the icon 510 in the window 509 by a predetermined distance rightward in the horizontal direction. A state obtained after the position or size of the icon 510 has been changed by a user operation performed on the icon 510 is illustrated in FIG. 5B.

In step S704, the image capturing control unit 205 determines whether the execution button 512 has been pressed by the user. If it is determined that the execution button 512 has not been pressed (NO in step S704), the image capturing control unit 205 advances the processing to step S707. If it is determined that the execution button 512 has been pressed (YES in step S704), the image capturing control unit 205 advances the processing to step S705. In step S705, the image capturing control unit 205 specifies an image capturing area satisfying the first condition related to positions and the second condition related to sizes. Next, in step S706, the image capturing control unit 205 generates a control command for obtaining a pan value, a tilt value, and a zoom value used to attain the specified image capturing area, and the communication unit 201 transmits the generated control command to the image capturing apparatus 100. The image capturing apparatus 100 controls the image capturing area by controlling at least one of pan, tilt, or zoom operation(s) based on the received control command. An image captured after the image capturing area has been controlled in the above-described manner is displayed in the video display portion 501 illustrated in FIG. 5C.

As described above, the information processing apparatus 200 in the first exemplary embodiment causes the display 400 to display a window used for controlling the image capturing area of the image capturing apparatus 100, which includes an icon corresponding to a target object serving as a criterion for control of the image capturing area. Then, based on a user operation for changing the position or size of the icon in the window, the information processing apparatus 200 controls the image capturing apparatus 100 to attain an image capturing area where the location of the icon in the window becomes approximately identical with the location of the target object in the captured image. Performing such control enables simplifying control of an image capturing area in which a subject is located at a position desired by the user in the image capturing area.

Figure 8:
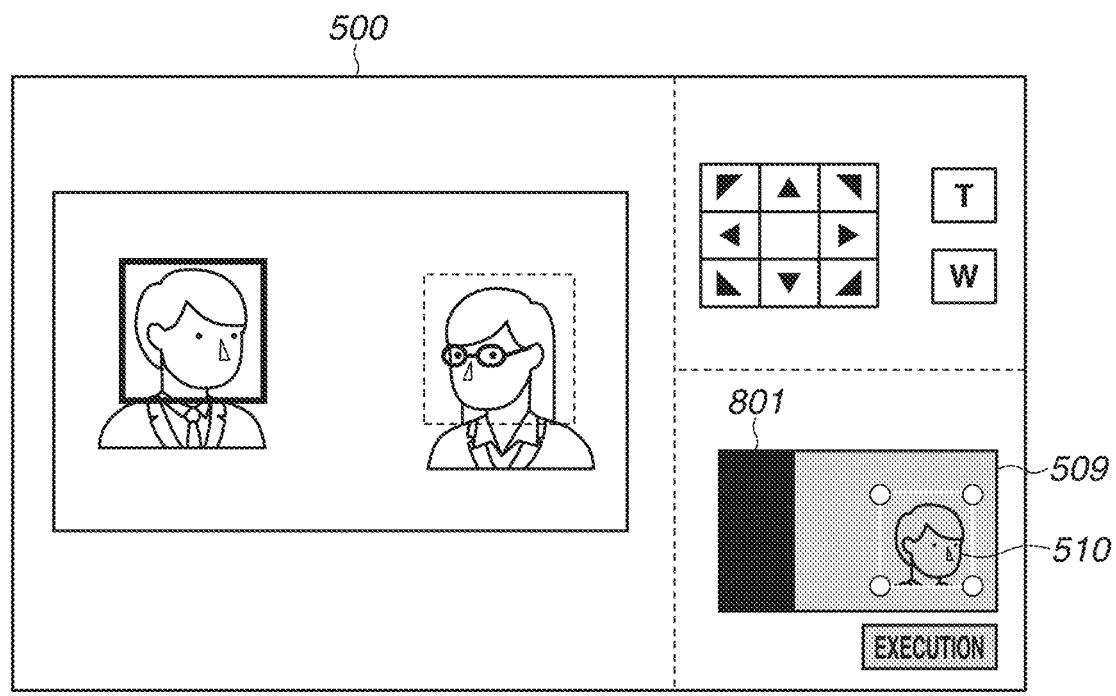
FIG. 8 is a diagram used to explain a GUI for controlling an image capturing area.

While, in the above description, controlling a pan value, a tilt value, and a zoom value of the image capturing apparatus 100, in other words, controlling an image capturing area via optical PTZ, has been described, this is not seen to be limiting. In another exemplary embodiment controlling an image capturing area can be done via electronic PTZ. The electronic PTZ is a function of clipping a partial region of the image captured by the image capturing apparatus 100 as an image capturing area. The drivable range for pan and tilt of the image capturing apparatus 100 can have limitations with respect to hardware configurations of the pan drive unit 103 and the tilt drive unit 104 of the image capturing apparatus 100. The drivable range for pan and tilt can also have limitations with respect to software due to the user previously setting a restriction on driving. In a case where pan and tilt values of the image capturing apparatus 100 are near such limitations, even if a composition designation is performed, a composition designated via the window 509 and an actual composition of an image captured by the image capturing apparatus 100 after the composition designation is performed can become different from each other. Therefore, as illustrated in FIG. 8, in the window 509, an out-of-range area 801 indicating an area that is specified based on the drivable range and in which a target object in the image capturing area is not able to be located can be displayed in a discriminable manner. The out-of-range area 801 represents an area in which locating a subject in a discriminable manner is difficult, so that the user is not able to locate the icon 510 in such an area. While, in FIG. 8, the out-of-range area 801 is expressed with a background color blackened, this is not seen to be limiting. In another exemplary embodiment, the out-of-range area 801 can be made discriminable by another display format. While, in the example illustrated in FIG. 8, an area in which driving is unable in the pan direction 105 is displayed as the out-of-range area 801, an area in which driving is unable in the tilt direction 106 can also be similarly displayed as an out-of-range area. While a limit can also be set on a range where the zoom value of the image capturing apparatus 100 is able to be changed, in that case, a limit can also be additionally set on a range where the size of the icon 510 is able to be changed.

In a second exemplary embodiment, processing for controlling the image capturing area such that the positional relationship (relative position) of an icon to a window and the positional relationship (relative position) of a target object targeted for tracking by control of the image capturing area to an image obtained by performing image capturing of the target object correspond to each other is described. In other words, the second exemplary embodiment is an exemplary embodiment enabling a composition designation of a target object targeted for tracking by control of the image capturing area. In the following description, processing that is performed by the image capturing apparatus 100 and the information processing apparatus 200 in the second exemplary embodiment is described with reference to FIG. 9 to FIG. 11.

The image capturing apparatus 100 in the second exemplary embodiment is an image capturing apparatus that can perform automatic tracking for controlling at least one of pan, tilt, or zoom operation(s) in association with movement of a target object serving as a tracking target such that the target object always falls within the image capturing area. The image capturing apparatus 100 can receive a command for performing automatic tracking to a target object (a tracking execution command), a command for stopping automatic tracking (a tracking stop command), and a command for designating a composition of the target object (a composition designation command). The composition designation command includes information about a position where to locate a target object serving as a tracking target in the image capturing area and a size of the target object in the image capturing area (hereinafter referred to as "composition information"). Only information about a position where to locate a target object serving as a tracking target in the image capturing area can be configured to be included as the composition information included in the composition designation command.

The image capturing apparatus 100 in the second exemplary embodiment is described with reference to FIG. 2. The system control unit 113 of the image capturing apparatus 100 in the second exemplary embodiment performs automatic tracking to a target object based on composition information. For example, the system control unit 113 of the image capturing apparatus 100 in the second exemplary embodiment specifies, as a target object for tracking, an object closest to the center of the current image capturing area in response to reception of a tracking execution command, and then starts automatic tracking with respect to the specified object. The condition for specifying an object as a target object is not limited to an object closest to the center of the image capturing area, and any other condition enabling implementation of the present embodiment is applicable. For example, an object satisfying any one of conditions for an object shown in the largest size and an object having a specific color can be specified as a target object. A configuration in which the user can set such a condition via the information processing apparatus 200 can be employed.

The storage unit 115 of the image capturing apparatus 100 in the second exemplary embodiment stores tracking state information indicating the state of the current automatic tracking. The tracking state information includes three types of states, i.e., "tracking in progress", "tracking in standby (a state where, although the tracking execution command has been received, there is no object trackable in the angle of view)", and "tracking in abeyance". While, in the second exemplary embodiment, the types of states include three types of states, this is not seen to be limiting and additional states enabling implementation of the present embodiment are applicable. Where the tracking state information indicates "tracking in progress", object identification information for identifying a target object for tracking is also additionally included in the stored tracking state information. The storage unit 115 also stores composition information included in the composition designation command transmitted from the information processing apparatus 200.

Next, a GUI that is displayed by the display control unit 204 of the information processing apparatus 200 in the second exemplary embodiment is described with reference to FIG. 9. A GUI 500 illustrated in FIG. 9 includes, in addition to the elements of the GUI 500 described with reference to FIGS. 5A to 5C, a tracking execution button 901, which is used for issuing an instruction for execution of automatic tracking, and a stop button 902, which is used for issuing an instruction for stopping of automatic tracking. When the operation reception unit 203 has received a user operation for pressing the tracking execution button 901, the image capturing control unit 205 generates a tracking execution command, and the communication unit 201 transmits the generated tracking execution command to the image capturing apparatus 100. When the operation reception unit 203 has received a user operation for pressing the stop button 902, the image capturing control unit 205 generates a tracking stop command, and the communication unit 201 transmits the generated tracking stop command to the image capturing apparatus 100. The image capturing apparatus 100, having received the tracking stop command, sets the tracking state information as "tracking in abeyance" and stores the set tracking state information in the storage unit 115.

Figure 9:
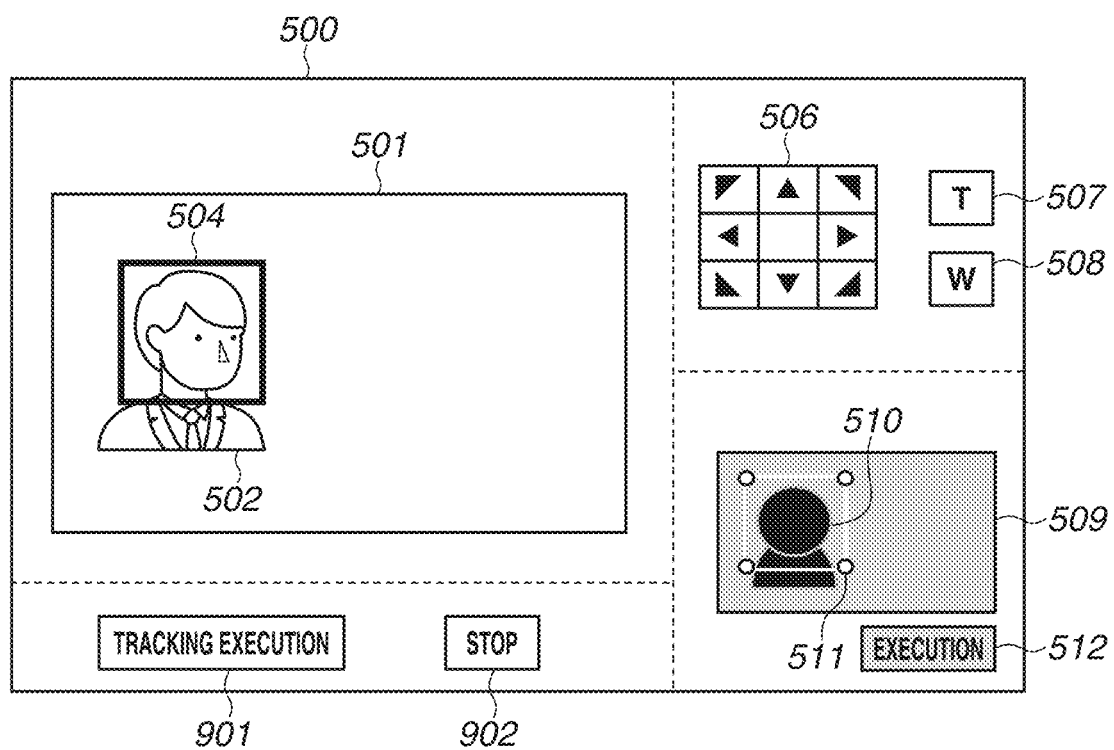
FIG. 9 is a diagram used to explain a GUI for designating a composition for automatic tracking.

In the example illustrated in FIG. 9, an icon 510 in a window 509 used for controlling the image capturing area is assumed to be an icon obtained by imitating a person. In response to an execution button 512 being pressed, the image capturing control unit 205 generates a composition designation command including composition information about the position and size of the icon 510 in the window 509, and the communication unit 201 transmits the generated composition designation command to the image capturing apparatus 100. Then, in response to receipt of the tracking execution command, the image capturing apparatus 100 performs automatic tracking to a target object based on composition information included in the composition designation command transmitted from the information processing apparatus 200. At this time, the system control unit 113 of the image capturing apparatus 100 refers to the composition information and performs automatic tracking while maintaining an image capturing area where the positional relationship (relative position) of the icon 510 to the window 509 and the positional relationship (relative position) of the target object to the captured image become identical. The system control unit 113 can perform control to attain an image capturing area satisfying, in addition to a first condition in which the positional relationship (relative position) of the icon 510 to the window 509 and the positional relationship (relative position) of the target object to the captured image, a second condition. More specifically, the second condition is a condition where the ratio of the size of the icon 510 to the size of the window 509 and the ratio of the size of the target object to the size of the captured image become identical. The system control unit 113 specifies an image capturing area satisfying the first condition related to positions and the second condition related to sizes, and performs automatic tracking while controlling a pan value, a tilt value, or a zoom value to attain the specified image capturing area.

Figure 10:
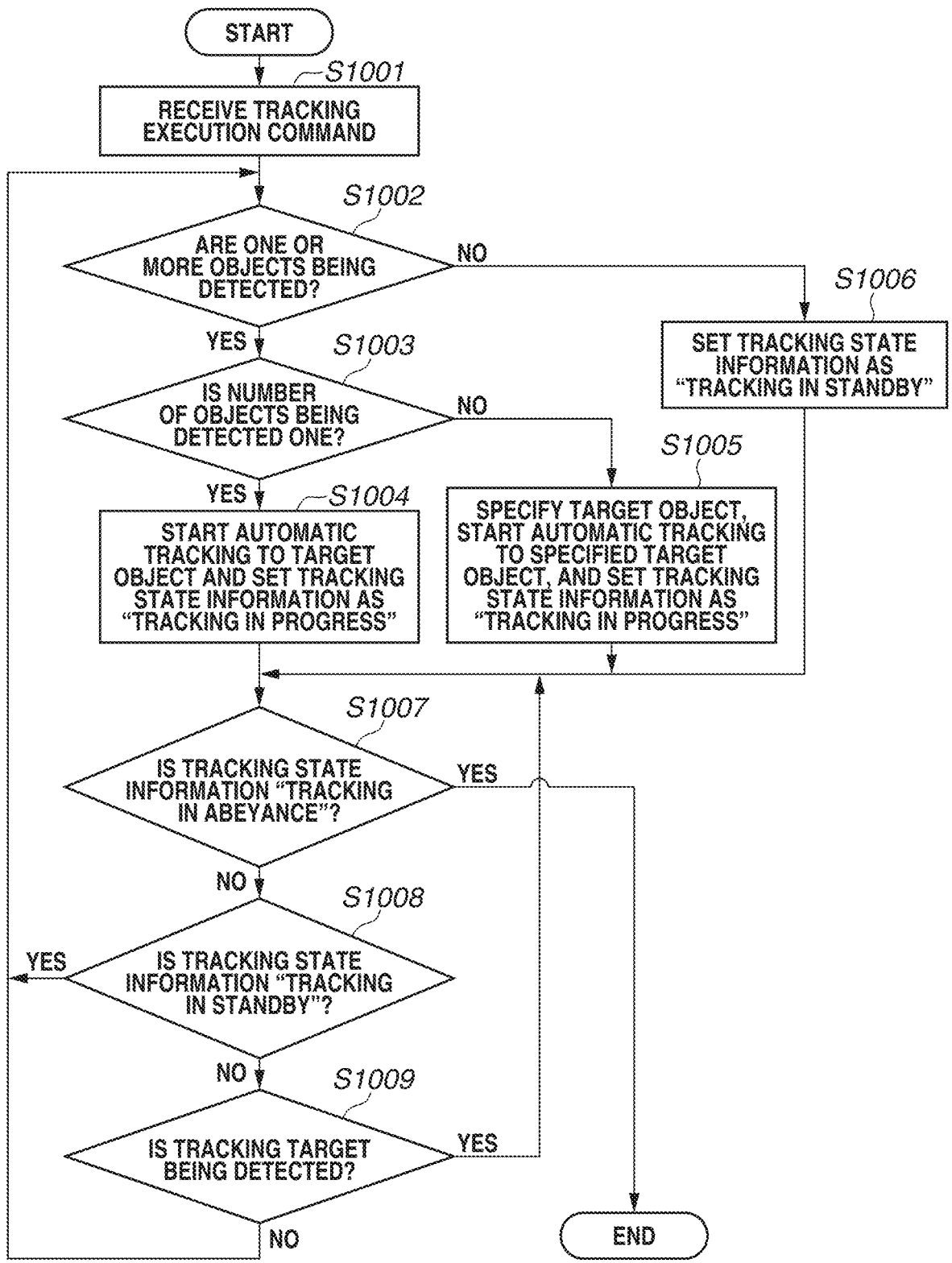
FIG. 10 is a flowchart illustrating the flow of processing for automatic tracking.

Next, processing for automatic tracking that is performed by the image capturing apparatus 100 in the second exemplary embodiment is described with reference to processing in the flow illustrated in FIG. 10. Processing in the flow illustrated in FIG. 10 is performed by the functional blocks illustrated in FIG. 3, which are implemented by, for example, the CPU 1200 of the image capturing apparatus 100 executing a computer program stored in the ROM 1220 of the image capturing apparatus 100.

In step S1001, the system control unit 113 acquires a tracking execution command transmitted from the information processing apparatus 200. Next, in step S1002, the system control unit 113 refers to detection result information and determines whether one or more objects are being detected in the latest captured image. If it is determined that one or more objects are not being detected (NO in step S1002), the system control unit 113 advances the processing to step S1006. In step S1006, the system control unit 113 sets the tracking state information as "tracking in standby" and stores the set tracking state information in the storage unit 115, and then advances the processing to step S1007. If, in step S1002, it is determined that one or more objects are being detected (YES in step S1002), the system control unit 113 advances the processing to step S1003. In step S1003, the system control unit 113 refers to detection result information and determines whether the number of objects that are being detected in the latest captured image is one. If it is determined that the number of objects being detected is one (YES in step S1003), the system control unit 113 advances the processing to step S1004. In step S1004, the system control unit 113 starts automatic tracking with the object being detected set as a target object for tracking, and then sets the tracking state information as "tracking in progress" and stores the set tracking state information in the storage unit 115. The tracking state information to be stored in the storage unit 115 at this time includes object identification information about the target object for tracking. If, in step S1003, it is determined that the number of objects being detected is not one (NO in step S1003), the system control unit 113 advances the processing to step S1005. In step S1005, the system control unit 113 specifies, as a target object, an object satisfying a predetermined condition from among a plurality of objects currently being detected, and then starts automatic tracking with respect to the specified target object. At this time, the system control unit 113 sets the tracking state information as "tracking in progress" and stores the set tracking state information in the storage unit 115. The tracking state information to be stored in the storage unit 115 at this time includes object identification information about the specified target object. While the object satisfying a predetermined condition is, for example, an object closest to the center of the image capturing area, the second exemplary embodiment is not limited to this, and such an object can be, for example, an object shown in the largest size or an object having a specific color.

In step S1007, the system control unit 113 determines whether the current tracking state information is "tracking in abeyance". If it is determined that the current tracking state information is "tracking in abeyance" (YES in step S1007), the system control unit 113 ends the processing in the flow illustrated in FIG. 10. If it is determined that the current tracking state information is not "tracking in abeyance" (NO in step S1007), the system control unit 113 advances the processing to step S1008. In a case where the stop button 902 described above with reference to FIG. 9 has been pressed by the user, a tracking stop command is transmitted from the information processing apparatus 200 to the image capturing apparatus 100. In response to receipt of the tracking stop command, the image capturing apparatus 100 updates the tracking state information to "tracking in abeyance". In step S1008, the system control unit 113 determines whether the current tracking state information is "tracking in standby". If it is determined that the current tracking state information is "tracking in standby" (YES in step S1008), the system control unit 113 returns the processing to step S1002, thus searching for a target object for tracking from among the detected objects. If, in step S1008, it is determined that the current tracking state information is not "tracking in standby" (NO in step S1008), the system control unit 113 advances the processing to step S1009. In step S1009, the system control unit 113 refers to the latest detection result information and determines whether the current tracking state is a state in which the system control unit 113 is detecting a target object for tracking. In other words, the system control unit 113 determines whether the system control unit 113 has not lost a target object for tracking. If it is determined that the current tracking state is a state in which the system control unit 113 is detecting a target object for tracking (a state in which the system control unit 113 has not lost a target object for tracking) (YES in step S1009), the system control unit 113 returns the processing to step S1007, thus determining whether the current tracking state information is "tracking in abeyance". If it is determined that the current tracking state is a state in which the system control unit 113 is not detecting a target object for tracking (a state in which the system control unit 113 has lost a target object for tracking) (NO in step S1009), the system control unit 113 returns the processing to step S1002, thus searching for a target object for tracking from among the detected objects.

Figure 11:
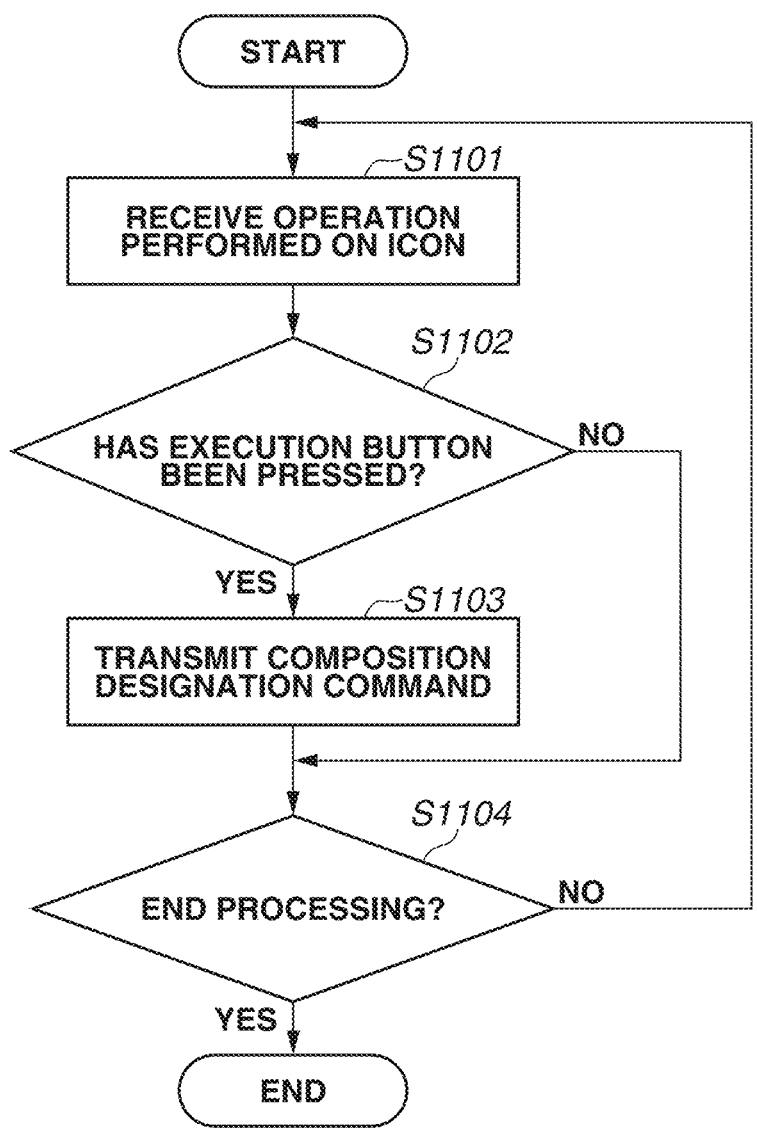
FIG. 11 is a flowchart illustrating the flow of processing for designating a composition in automatic tracking.

Next, processing for designating a composition during tracking of a target object that is performed by the information processing apparatus 200 is described with reference to FIG. 11. Processing in the flow illustrated in FIG. 11 is performed by the functional blocks illustrated in FIG. 4, which are implemented by, for example, the CPU 1200 of the information processing apparatus 200 executing a computer program stored in the ROM 1220 of the information processing apparatus 200.

First, in step S1101, the operation reception unit 203 receives a user operation for changing the position or size of the icon 510 in the window 509 illustrated in FIG. 9. Next, in step S1102, the image capturing control unit 205 determines whether a user operation for pressing the execution button 512 illustrated in FIG. 9 has been received. If it is determined that a user operation for pressing the execution button 512 has been received (YES in step S1102), the image capturing control unit 205 advances the processing to step S1103. If it is determined that a user operation for pressing the execution button 512 has not been received (NO in step S1102), the image capturing control unit 205 advances the processing to step S1104. In step S1103, the image capturing control unit 205 generates a composition designation command including composition information about the position and size of the icon 510 in the window 509, and the communication unit 201 transmits the generated composition designation command to the image capturing apparatus 100. When the tracking state information about the image capturing apparatus 100 having received the composition designation command is "tracking in progress", the image capturing apparatus 100 performs automatic tracking with respect to a target object based on composition information included in the newly acquired composition designation command. In a case where the tracking state information about the image capturing apparatus 100 having received the composition designation command is "tracking in standby" or "tracking in abeyance", if the tracking state information has next become "tracking in progress", the image capturing apparatus 100 performs automatic tracking with respect to a target object based on composition information included in the newly acquired composition designation command. If, in step S1104, it is determined that a user instruction for ending has been received (YES in step S1104), the image capturing control unit 205 ends the processing in the flow illustrated in FIG. 11. If it is determined that no user instruction for ending has been received (NO in step S1104), the image capturing control unit 205 returns the processing to step S1101.stopped As described above, the information processing apparatus 200 in the second exemplary embodiment uses composition information about the icon 510 located by the user in the window 509 as a composition of a target object for tracking in the case of performing automatic tracking. This enables performing automatic tracking while maintaining control of an image capturing area such that a subject is located at a position desired by the user in the image capturing area.

While, in the above description, an example in which the image capturing apparatus 100 controls an image capturing area thereof in such a way as to track a target object for tracking based on the received composition information has been described, this is not seen to be limiting. In another exemplary embodiment, the image capturing control unit 205 of the information processing apparatus 200 can generate a control command for controlling the image capturing area to track a target object for tracking based on the composition information and transmit the generated control command to the image capturing apparatus 100, thus controlling the image capturing area of the image capturing apparatus 100. For example, the image capturing control unit 205 refers to information about the position and size of the icon 510 in the window 509 included in the composition information and performs control processing for specifying an image capturing area satisfying a first condition related to positions and a second condition related to sizes, generating a control command for attaining the specified image capturing area, and transmitting the generated control command to the image capturing apparatus 100. The image capturing control unit 205 performing this control processing each time the position or size of a target object detected from an image is changed enables the information processing apparatus 200 to control the image capturing apparatus 100 to perform automatic tracking with respect to a target object.

While, in the above description, an example in which the image capturing apparatus 100 specifies, as a target object serving as a tracking target, an object closest to the center of the image capturing area has been described, for example, a configuration in which the target object is designated by the user can be employed. An example in this case will now described. When having detected an object from an image, the detection unit 116 generates detection result information about the detected object. At this time, the detection result information associated with an image includes information about the position and size of an object detected in the image and also includes object identification information for identifying the object. When a given object that has been detected in an image in the preceding frame has also been detected in an image in the current frame, the detection unit 116 assigns the same object identification information to the given object with regard to the preceding frame and the current frame. Thus, the same object identification information is assigned to the same object.

Detection result information associated with an image and image data about the image are transmitted to the information processing apparatus 200. Then, when a given object has been selected as a target object via the GUI 500 of the information processing apparatus 200 and an instruction for tracking execution has been issued, a tracking execution command including object identification information for identifying the given object is transmitted to the image capturing apparatus 100. The system control unit 113 specifies a target object from among objects currently detected by the detection unit 116 based on the object identification information included in the received tracking execution command. Then, the system control unit 113 performs automatic tracking while controlling the image capturing area such that the target object becomes set to the designated composition based on composition information included in the further received composition designation command. In this way, a configuration where the user specifies a target object as a tracking target can be employed.

Next, a hardware configuration of the information processing apparatus 200 for implementing the functions in the above-described exemplary embodiments is described with reference to FIG. 12. While, in the following description, a hardware configuration of the information processing apparatus 200 is described, the image capturing apparatus 100 is assumed to also be implemented by a similar hardware configuration.

The information processing apparatus 200 in the above-described exemplary embodiments includes a central processing unit (CPU) 1200, a random access memory (RAM) 1210, a read-only memory (ROM) 1220, a hard disk drive (HDD) 1230, and an interface (I/F) 1240.

The CPU 1200 is a central arithmetic device that controls the information processing apparatus 200. The RAM 1210 temporarily stores a computer program that the CPU 1200 executes. The RAM 1210 provides a work area that the CPU 1200 uses to perform processing. The RAM 1210 functions, for example, as a frame memory or functions as a buffer memory.

The ROM 1220 stores, for example, programs that the CPU 1200 executes to control the information processing apparatus 200. The HDD 1230 is a storage device that records, for example, image data.

The I/F 1240 performs communication with an external apparatus via the network 300 in conformity with the Transmission Control Protocol/Internet Protocol (TCP/IP) or the HyperText Transfer Protocol (HTTP).

While, in the above-described exemplary embodiments, an example in which the CPU 1200 performs processing has been described, at least a part of the processing that the CPU 1200 performs can be configured to be performed by dedicated hardware. For example, processing for displaying a graphical user interface (GUI) or image data on the display 400 can be performed by a graphics processing unit (GPU). Processing for reading out program code from the ROM 1220 and loading the program code into the RAM 1210 can be performed by direct memory access (DMA), which functions as a transfer device.

The present disclosure can also be implemented by processing where one or more processors read out and execute a program that implements one or more functions of the above-described exemplary embodiments. The program can be configured to be supplied to a system or apparatus including the processor via a network or a storage medium.

The present disclosure can be implemented by a circuit that implements one or more functions of the above-described exemplary embodiments (for example, an application specific integrated circuit (ASIC)). Each unit of the information processing apparatus 200 can be implemented by hardware illustrated in FIG. 12, or can be implemented by software. One or more functions of the information processing apparatus 200 in the above-described exemplary embodiments can be included in another apparatus.

While the present disclosure has been described above with regard to exemplary embodiments, the above-described exemplary embodiments represent merely examples of embodiments for implementing the present disclosure, and the technical scope of the present disclosure should not be construed to be limited by those embodiments. Thus, the present disclosure can be implemented in various manners within a range not departing from the technical ideas or principal features of the present disclosure. For example, a combination of the above-described exemplary embodiments is also included in the disclosure content of the present specification.

According to the above-described exemplary embodiments, it is possible to simplify an operation for controlling an image capturing area such that a subject is located at a position desired by the user in the image capturing area.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-158441 filed Sep. 28, 2021, which is hereby incorporated by reference herein in its entirety.

What is claimed is:

1. An information processing apparatus that communicates with an image capturing apparatus including an image capturing unit, the information processing apparatus comprising:
   a memory; and
   a processor configured to communicate with the memory,
      wherein the processor executes a program stored in the memory to cause the information processing apparatus to:

cause a display unit to display a first window including an image captured by the image capturing unit and a second window including an icon representing a target object detected from the image captured by the image capturing unit;

receive a user operation to change a position of the icon in the second window displayed on the display unit;

control an image capturing area of the image capturing unit based on the user operation so that the target object is positioned at a corresponding area of the image indicated by the position of the icon in the second window; and control the image capturing area of the image capturing unit in accordance with a movement of the target object so that the image capturing unit continues to capture the target object at the corresponding area of the image, wherein an image capturing direction of the image capturing apparatus is controlled to position the target object in the first window to the identical position of the icon in the second window.

2. The information processing apparatus according to claim 1, wherein the first window and the second window are displayed on the display unit in side by side arrangement.

3. The information processing apparatus according to claim 1, wherein the image capturing area is controlled to track the target object so that the position of the icon in the second window corresponds to the position of the detected target object.

4. The information processing apparatus according to claim 1, wherein the image capturing area is controlled such that a ratio of a size of the target object in the captured image to a size of the captured image and a ratio of a size of the icon in the second window to a size of the second window correspond to each other.

5. The information processing apparatus according to claim 1, wherein the information processing apparatus specifies the target object from among objects detected from an image captured by the image capturing unit.

6. The information processing apparatus according to claim 5, wherein the information processing apparatus acquires a detection result of an object in the captured image, wherein the information processing apparatus causes the display unit to display the first window including the captured image on which a frame indicating a position of the object detected from the captured image has been superimposed based on the detection result, and wherein, in a case where a user operation for designating a specific frame with respect to the captured image, on which the frame indicating the position of the object has been superimposed, is received, an object corresponding to the designated specific frame is specified as the target object.

7. The information processing apparatus according to claim 1, wherein the icon is a clipped image of the target object in the captured image.

8. The information processing apparatus according to claim 1, wherein the target object is a person and the icon is a mark obtained by imitating a person.

9. The information processing apparatus according to claim 1, wherein an aspect ratio of the captured image and an aspect ratio of the second window are identical.

10. The information processing apparatus according to claim 1, wherein a display form of a first area in which the icon is restricted from being located in the second window is different from a display form of an area other than the first area.

11. The information processing apparatus according to claim 10, wherein the first area in which the icon is restricted from being located is an area that is specified based on a drivable range of the image capturing unit.

12. The information processing apparatus according to claim 1, wherein the image capturing direction of the image capturing apparatus is the direction in which the optical axis of a lens is directed by a pan, tilt, and zoom control.

13. An information processing method comprising:

causing a display unit to display a first window including an image captured by an image capturing unit and a second window including an icon representing a target object detected from the image captured by the image capturing unit; and receiving a user operation to change a position of the icon in the second window displayed on the display unit;

controlling an image capturing area of the image capturing unit based on the user operation so that the target object is positioned at a corresponding area of the image indicated by the position of the icon in the second window; and control the image capturing area of the image capturing unit in accordance with a movement of the target object so that the image capturing unit continues to capture the target object at the corresponding area of the image, wherein an image capturing direction of the image capturing apparatus is controlled to position the target object in the first window to the identical position of the icon in the second window.

14. A non-transitory computer-readable storage medium storing computer-executable instructions that, when executed by a computer, cause the computer to perform a method, the method comprising:

causing a display unit to display a first window including an image captured by an image capturing unit and a second window including an icon representing a target object detected from the image captured by the image capturing unit;

receiving a user operation to change a position of the icon in the second window displayed on the display unit;

controlling an image capturing area of the image capturing unit based on the user operation so that the target object is positioned at a corresponding area of the image indicated by the position of the icon in the second window; and control the image capturing area of the image capturing unit in accordance with a movement of the target object so that the image capturing unit continues to capture the target object at the corresponding area of the image, wherein an image capturing direction of the image capturing apparatus is controlled to position the target object in the first window to the identical position of the icon in the second window.

* * * * *